J. P. SIMMONS.
Packing the Joints of Barometers.
No. 196,995. Patented Nov. 13, 1877.
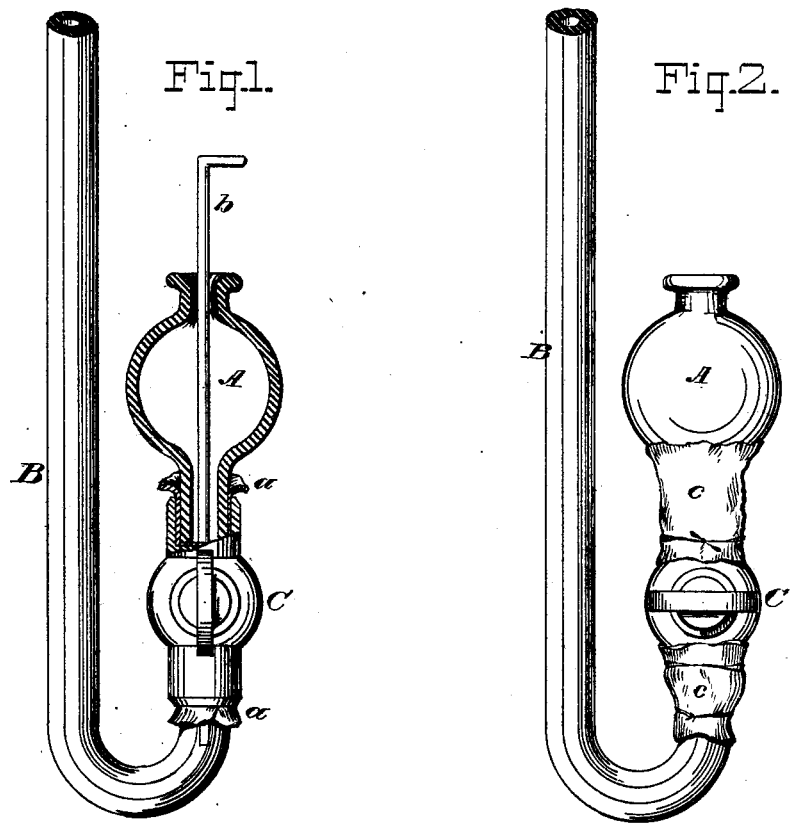

UNITED STATES PATENT OFFICE.

JONATHAN P. SIMMONS, OF FULTON, NEW YORK, ASSIGNOR TO HENRY A. SIMMONS, OF SAME PLACE.

IMPROVEMENT IN PACKING THE JOINTS OF BAROMETERS.

Specification forming part of Letters Patent No. 196,995, dated November 13, 1877; application filed April 27, 1877.

*To all whom it may concern:*

Be it known that I, JONATHAN P. SIMMONS, of Fulton, in the county of Oswego and State of New York, have invented certain Improvements in Packing the Joints of Barometers, of which the following is a specification:

This invention relates to that class of siphon-barometers in which a cock is interposed between the lower end of the glass tube and the glass cistern; the object being to produce perfectly air-tight joints at the points where the metal cock connects with the glass of the tube and cistern.

The invention consists, essentially, in the method or process used in packing the joint or joints, which will be fully hereinafter set forth.

In the drawings, Figure 1 shows a barometer, partly in section, illustrating the first step in packing the joints. Fig. 2 shows a barometer with the joints packed according to my invention. Fig. 3 shows the preferred shape of the absorbent materials used.

Let A represent the glass cistern of a siphon-barometer, B the glass tube of the same, and C the metal cock connecting the two.

The construction and arrangement of these parts in producing a portable barometer are old. I only claim as my present invention the means and method of packing the joints.

Heretofore, by the ordinary methods of packing the joints between the glass and iron, it was difficult to keep them perfectly tight for any length of time, owing to the unequal expansion and contraction of the parts under varying temperatures. The glass would draw away from the cement, and the latter would crack and crumble.

In forming the joints under my invention, I first pass the wire $b$ down through the cistern A; then string upon the end of it a piece of some suitable absorbent material—preferably chamois-skin—of the shape shown at $a$ in Fig. 3, having first saturated it in silicate of soda.

I then force the neck of the cistern and the saturated material down into the socket of the cock. The wire $b$ is now pushed on through the cock, and another piece of saturated material similar to that above mentioned is strung upon its end, and the end of the tube B forced into its socket. The wire $b$, which serves as a guide in the operation and keeps the opening clear, is now withdrawn. The surplus leather or skin is trimmed off, and the pores and interstices are filled with silicate of soda. After these joints are dry, I wrap them with pieces of the absorbent material, cut as shown at $c$ in Fig. 3, and saturated with the silicate. While yet moist I wrap the same tightly with thread, as shown, and this causes the leather to adhere closely to the metal and glass.

After the silicate of soda is perfectly dry, the glass cannot be removed from its socket in the iron without breaking it in pieces, and the silicate and absorbent material are so firmly attached to the glass and iron that they can only be detached with difficulty.

A joint made and packed in this manner is not affected by ordinary changes in temperature nor by moisture.

I claim—

The herein-described process of packing the joints of barometers, in which the wire $b$ is employed, as set forth, a piece of chamois-skin, $a$, saturated with silicate of soda, is forced into the joint and allowed to dry, and another piece, $c$, is then smeared on the inner face with the silicate of soda, passed around the joint, and wrapped with thread while yet soft, all as specified.

In witness whereof I have hereunto signed my name in the presence of two subscribing witnesses.

JONATHAN P. SIMMONS.

Witnesses:
E. S. PARDEE,
H. C. HOWE.